US009237436B2

(12) United States Patent
Belfort et al.

(10) Patent No.: US 9,237,436 B2
(45) Date of Patent: Jan. 12, 2016

(54) CENTRALIZED COMMUNICATION MANAGEMENT VIA A VIRTUAL OPERATOR FOR CONNECTING SUBSCRIBER CALLS TO HOST NETWORKS

(75) Inventors: Véronique Belfort, Velizy (FR); Guylaine Queau, Velizy (FR)

(73) Assignee: Alcatel Lucent, Boulogne-Billancourt (FR)

( * ) Notice: Subject to any disclaimer, the term of this patent is extended or adjusted under 35 U.S.C. 154(b) by 1201 days.

(21) Appl. No.: 12/308,375

(22) PCT Filed: Jun. 14, 2007

(86) PCT No.: PCT/EP2007/055931
§ 371 (c)(1),
(2), (4) Date: Mar. 25, 2010

(87) PCT Pub. No.: WO2007/147777
PCT Pub. Date: Dec. 27, 2007

(65) Prior Publication Data
US 2010/0189019 A1 Jul. 29, 2010

(30) Foreign Application Priority Data
Jun. 21, 2006 (FR) .................................... 06 05508

(51) Int. Cl.
*H04W 8/02* (2009.01)
*H04W 88/18* (2009.01)

(52) U.S. Cl.
CPC ................ *H04W 8/02* (2013.01); *H04W 88/18* (2013.01)

(58) Field of Classification Search
CPC ....... H04W 88/18; H04W 8/02; H04W 88/14;
H04W 88/12; H04W 92/06; H04W 16/16;
H04W 84/02; H04W 84/045; H04W 84/105;
H04W 8/18; H04W 36/12; H04W 28/16;
H04W 28/24; H04W 92/04; H04B 7/005;
H04L 65/1023

USPC ............... 455/41.2, 517, 403, 418, 432.3, 455/433–434, 435.2, 445, 515, 524–525, 455/550.1, 552.1, 554.1–554.2, 556.2, 455/560–561; 370/310, 310.2, 328, 338, 370/395.5, 398, 401, 408, 422, 430, 370/901–902, 911–913
See application file for complete search history.

(56) References Cited

U.S. PATENT DOCUMENTS 6,693,894 B1 * 2/2004 Andersson et al. ........... 370/352
7,286,524 B1 * 10/2007 Loftus .......................... 370/354

(Continued)

FOREIGN PATENT DOCUMENTS

WO    WO 03/058996    7/2003

*Primary Examiner* — Meless Zewdu
(74) *Attorney, Agent, or Firm* — Harness, Dickey & Pierce, P.L.C.

(57) ABSTRACT

A communication system (SC) comprises i) a centralized platform (PC) that can be used by at least one virtual operator and that comprises at least equipment and services management means (EG1), subscriber/subscription data management means (EG2) and a call server (SA), responsible for jointly managing the control plane layer, and ii) at least one distributed media gateway (PMi) connected to the centralized platform (PC) via a backbone network (RF)I and responsible for the interconnection between the centralized platform (PC) and a routing center (Ai), of a communication network (RMf) of an associated network operator, responsible for routing calls concerning communication terminals (UE) connected to its communication network (RMi) and managed by the centralized platform (PC) and for controlling a user plane layer of the environment of the system (SC).

9 Claims, 1 Drawing Sheet

(56) References Cited

U.S. PATENT DOCUMENTS

| | | | |
|---|---|---|---|
| 7,392,035 B2* | 6/2008 | Rahman et al. | 455/406 |
| 7,782,818 B2* | 8/2010 | Hurtta et al. | 370/331 |
| 7,787,905 B2* | 8/2010 | Witzel et al. | 455/560 |
| 7,899,167 B1* | 3/2011 | Rae | 379/189 |
| 2003/0134614 A1* | 7/2003 | Dye | 455/406 |
| 2004/0162058 A1* | 8/2004 | Mottes | 455/411 |
| 2005/0064889 A1* | 3/2005 | Haumont | 455/514 |
| 2006/0142011 A1* | 6/2006 | Kallio | 455/445 |
| 2006/0171402 A1* | 8/2006 | Moore et al. | 370/401 |
| 2006/0276193 A1* | 12/2006 | Itzkovitz et al. | 455/445 |
| 2007/0049329 A1* | 3/2007 | Mayer et al. | 455/552.1 |
| 2007/0121584 A1* | 5/2007 | Qiu et al. | 370/352 |

* cited by examiner

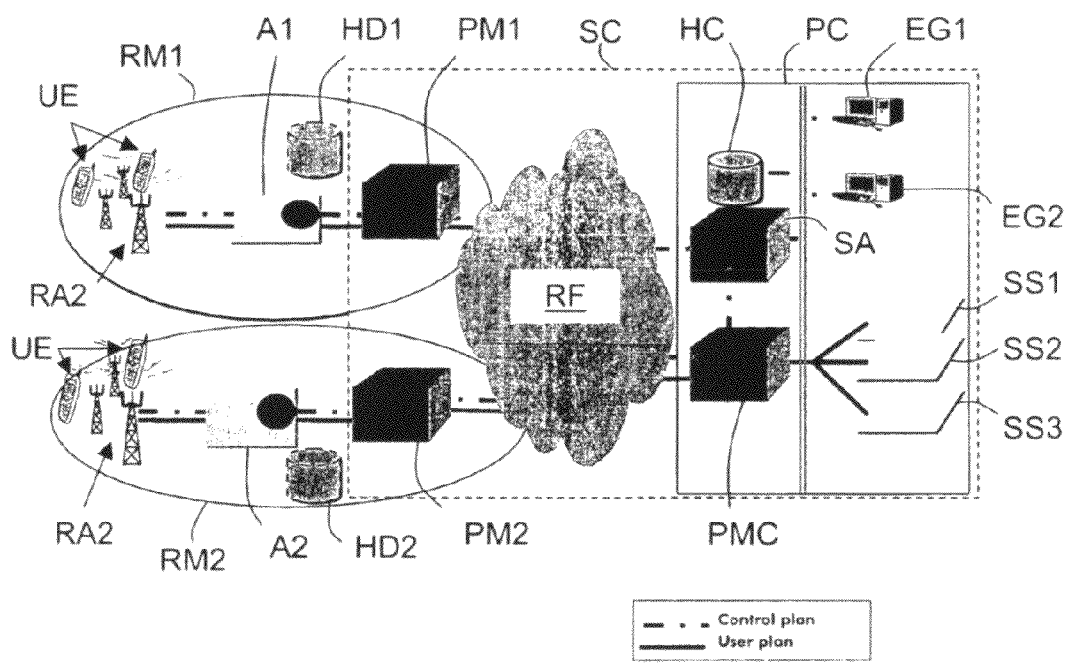

CENTRALIZED COMMUNICATION MANAGEMENT VIA A VIRTUAL OPERATOR FOR CONNECTING SUBSCRIBER CALLS TO HOST NETWORKS

The invention relates to mobile or fixed communication networks, and more precisely to the management by virtual operators of calls concerning the communication terminals of their subscribers when they are connected to host communication networks.

As those skilled in the art know, certain users of communication terminals (for example mobile communication terminals) have taken out subscriptions with (mobile) operators, called virtual operators, better known by the acronym (M)VNO (for "(Mobile) Virtual Network Operator") that do not have a radio access network. The infrastructure used by these mobile virtual operators is known by the acronym MVNE (for "Mobile Virtual Network Enabler"). These mobile virtual operators must therefore make agreements with mobile operators (or MNOs (for "Mobile Network Operators")) that have a mobile communication network, so that their subscribers can obtain the services that are defined by their respective subscriptions. Through these agreements, the mobile operator (MNO) provides the mobile virtual operator (MVNO) with the radio access resources. In addition, each mobile virtual operator must have, in each country in which one of its subscriptions is valid, distributed network equipment locally providing the management of the calls. Amongst these items of distributed network equipment it is possible mainly to cite a distributed database of the HLR type ("Home Location Register"—equipment storing information relating in particular to the location of the communication terminals of the users that have taken out a subscription with the mobile virtual operator and to services corresponding to these subscriptions), a switching routing center, of the subscriber center or transit center type, and means for providing distributed services.

This causes a redundancy of network equipment for the (mobile) virtual operator in each of the countries that it wants to cover, and therefore considerable deployment and maintenance costs. In addition, it prevents the use of centralized call and services management functions, resource (or "provisioning") and billing management in particular.

The object of the invention is therefore to enhance the situation, both in the case of host mobile networks and in the case of host fixed networks.

For this purpose, it proposes a communication system (or (M)VNE) comprising:
  a centralized platform that can be used by at least one virtual operator ((M)VNO) and comprising at least equipment and services management means, subscription/subscriber data management means and a call server, responsible for jointly managing the control plane layer of the (M)VNE "environment",
  at least one distributed media gateway (or MGW) connected to the centralized platform via a backbone network, and responsible, on the one hand, for the interconnection between the centralized platform and a (mobile or fixed) routing center, of a (mobile or fixed) communication network of an associated network operator, responsible for routing calls concerning communication terminals that are connected to its communication network and that are managed by the centralized platform, and, on the other hand, for controlling the user plane layer (or media layer) of the (M)VNE environment.

The system according to the invention may comprise other features that may be taken separately or in combination, and in particular:
  storage means (for example of the HLR or HSS type) responsible for storing information relating, on the one hand, to the location of the (mobile or fixed) communication terminals of the users who have taken out a subscription with the virtual operator, and, on the other hand, at least to services corresponding to these subscriptions;
    these storage means may, for example, be installed at least in part in the centralized platform;
    as a variant, or in addition, the storage means may be installed at least in part in one or more platforms of at least one of the host communication networks;
    in another variant, the storage means may be installed in each of the host communication networks according to the inter-operator agreements;
  the centralized platform may comprise means for providing centralized services responsible for providing chosen centralized services to the communication terminals of subscribed users, and a centralized media gateway connected to the backbone network and to the means for providing centralized services and responsible, when a distributed media gateway transmits a user plane layer to it, for managing this user plane layer in order to provide at least certain of the centralized services to the communication terminals of the users who have subscribed to these centralized services;
  the centralized platform may, for example, be coupled to means for providing distributed services of the host communication networks, via nodes of the SGSN (for "Serving GPRS Support Node") type of the latter, and be responsible for managing the user plane and control layers in order to provide, through nodes of the GGSN (for "Gateway GPRS Support Node") type, at least certain of the distributed services to the communication terminals of the users who have subscribed thereto;
  the backbone network may, for example, provide at least a quality of service and a traffic classification at its ends;
  the backbone network may, for example, be of the IP ("Internet Protocol") and/or ATM (for "Asynchronous Transfer Mode") and/or TDM (for "Time Division Multiplexing") type;
  the backbone network may, for example, provide the transport of voice and signaling under IP.

The invention is particularly well suited, although not exclusively, to communication networks whose architecture is of the NGN ("New Generation Network"—defined in version no. 4 of the GSM) type. It may also evolve to support infrastructures of the IMS (for "IP Multimedia Subsystem"), or UMA (for "Unlicenced Mobile Access") type and it makes it possible to support fixed or mobile subscribers with network access functions distributed in various countries or regions.

Other features and advantages of the invention will appear on examination of the following detailed description, and of the appended drawing, in which the single FIGURE illustrates very schematically a communication system according to the invention connected to two host mobile networks. The appended drawing may not only serve to supplement the invention, but also contribute to its definition if necessary.

The object of the invention is to allow the centralized management by a virtual operator of the calls concerning the (mobile or fixed) communication terminals of its subscribers, when they are connected to (mobile or fixed) host communication networks belonging to (mobile or fixed) operators.

In the following, it is considered as a nonlimiting example that the host communication networks are installed in different countries (or regions), that they are of the mobile type and that they belong to different mobile operators (or MNO). For example, the host mobile communication networks are networks of the UMTS (3G) or GSM (2G) type, but this is not obligatory. As a variant, it could, for example, involve mobile networks of the GPRS/EDGE or else CDMA (2000) type. It may also involve fixed host networks belonging to fixed operators having made agreements with a virtual operator (or VNO for "Virtual Network Operator").

In the example illustrated schematically in the single FIGURE, a communication system SC according to the invention is connected to two host mobile communication networks RM1 and RM2, of the UMTS type. But, a communication system SC according to the invention may be connected to any number of mobile communication networks provided that the number is greater than or equal to one (1).

As illustrated in FIG. 1, each mobile network RMi (here i=1 or 2) may, in a very schematic manner but nevertheless sufficient for the understanding of the invention, be summarized as a core network coupled to a radio access network RAi, itself connected to a network management system (NMS), not shown.

Each radio access network RAi comprises mainly base stations (called Node Bs (or BTSs in the case of a GSM network)) and radio network controllers or nodes (called RNCs (or BSCs in the case of a GSM network)), connected together. Each base station is associated with at least one (logical) cell covering a radio zone (or coverage zone) in which mobile (or cellular) radio communication terminals UE may establish (or continue) radio links.

In the following, it is considered, as a nonlimiting example, that the radio communication terminals UE are mobile (or cellular) telephones. But, the invention is not limited to this type of terminal. It relates specifically to all units of mobile (or portable or else cellular) communication equipment capable of interchanging data via waves with another item of equipment (mobile or not) via a radio access network, but also items of fixed communication equipment. Consequently, it may also involve, for example, fixed telephones, hybrid telephones (for example GSM and WiFi), communicating personal digital assistants (or PDAs), servers or fixed or portable (or laptop) computers.

Each core network comprises items of network equipment that, in some cases, are connected in particular to radio network controllers.

The communication system SC according to the invention belongs to a mobile virtual operator of the MVNO ("Mobile Virtual Network Operator") type. In this instance, it constitutes what is usually called an MVNE ("Mobile Virtual Network Enabler"). But, it may also be shared by several MVNOs (then called hosted configurations). In the latter case, the various MVNOs share the resources of the MVNE.

In the following, the communication system SC is considered, as an illustrative nonlimiting example, to belong to a single mobile virtual operator (MNVO).

A communication system SC according to the invention comprises at least one centralized platform PC, distributed media gateways PMi of the MGW (for "Media Gateway") type in number at least equal to the number of (here mobile) RMi networks with which it is connected (and associated). This communication system SC also uses a backbone network RF, for example of the IP ("Internet Protocol") and/or ATM (for "Asynchronous Transfer Mode") and/or TDM ("Time Division Multiplexing") type, for the transport of information between various nodes, and in particular between the centralized platform PC and each of the distributed media gateways PMi.

The centralized platform PC comprises at least a first item of management equipment EG1, responsible for managing the items of equipment of the communication system SC and their configurations, and the services offered to the subscribers, a second item of management equipment (or "provisioning") EG2, responsible for managing the subscription and services data associated with the subscribers, and a call server SA.

The backbone network RF is arranged so as to connect the centralized platform PC (and in particular at least its call server SA and its centralized media gateway PMC) to each distributed media gateway PMi installed in one of the associated mobile networks RMi. It will be noted that the backbone network RF may either form part of the communication system SC and hence belong to its (M)VNO, or be supplied and managed by a third party entity (other than the (M)VNO).

This backbone network RF is preferably configured so as to offer at least a quality of service and a traffic classification at its ends, that is to say at its inputs/outputs on the side of the centralized infrastructure and on the side of the mobile networks RMi. Furthermore, in order to allow the use of applications in real time under IP, such as, for example, telephone (voice) conversations, the backbone network RF, when it is of the IP type, is also preferably configured so as to provide the transport of the voice and the signaling under IP.

Each distributed media gateway PMi (in this instance equal in number to two as a purely illustrative example) performs functions similar to those performed by a conventional media gateway of the MGW type, well known to those skilled in the art, and signaling functions (to return the signaling to the centralized gateway PC).

Thus, it is in particular responsible for the interconnection between the mobile network RMi in which it is installed and the associated centralized platform PC, and particularly its call server SA.

Each distributed media gateway PMi is also responsible for controlling what those skilled in the art call the user plane layer (or else the media layer) of the MVNE environment (that is to say of the communication system SC).

Controlling the user plane layer in this instance is understood to be providing the UE mobile terminals (of the subscribers that are connected to a host mobile network RMi) with distributed services that are offered by their host mobile network RMi and that form part of the subscription taken out by their user with the MVNO, and/or transmitting (or forwarding) the user plane layer to the centralized platform PC so that it offers the mobile terminals UE (of the subscribers that are connected to a host mobile network RMi) at least certain of the (centralized) services forming part of the subscription taken out by their user with the MVNO.

In other words, the services used by a mobile terminal UE of a client of the MVNO may be supplied by the host mobile network RMi (they are then called distributed) and/or by the centralized platform PC of the MVNO (they are then called centralized).

For a distributed media gateway PMi to be able to supply distributed services, where necessary in addition to those (centralized) services offered by the centralized platform PC, it must be connected to means for providing distributed services (not shown in the single FIGURE) of the host mobile network RMi in which it is installed.

These means for providing distributed services may for example be in the form of services equipment (for example of the IP type) connected to the host mobile network RMi.

"Services equipment" in this instance is understood to be an item of equipment offering services, such as, for example, an audio and/or video broadcasting server. But the means for providing distributed services may also be items of equipment (such as for example servers) forming part of the core network of the host mobile network RMi. As illustrated in the single FIGURE, for the centralized platform PC to be able to provide services, where necessary in addition to those offered by a host mobile network RMi, it must comprise means for providing centralized services SS1-SS3 and a centralized media gateway PMC.

The centralized media gateway PMC performs functions similar to those performed by a conventional media gateway of the MGW type. Therefore, it is mainly responsible for managing the control plane layer in cooperation with the call server SA with respect to its portion relative to the services, and the user plane layer of the MVNE environment (SC) that is transmitted by a distributed media gateway PMi. What is meant here by managing the user plane layer is providing mobile terminals UE (of the subscribers that are connected to a host mobile network RMi) with centralized services that are offered by the centralized platform PC and that form part of the subscription taken out by their user with the MVNO (such as for example managing voice in the context of voice service(s)).

The means for providing centralized services may for example be in the form of services equipment SS1 to SS3. What is meant here "services equipment" is an item of equipment offering services, such as for example an audio and/or video broadcasting server. In the example illustrated in the single FIGURE, the services servers SS1 to SS3 form part of the centralized platform PC, and are more precisely connected to its centralized media gateway PMC, but this is not obligatory (they may specifically be connected indirectly to the centralized media gateway PMC).

The centralized media gateway PMC or a distributed media gateway PMi is informed of the centralized or distributed services that must be provided to a mobile terminal UE by information data that are stored in storage means HC or HDi on which more will be said later, under the control of the call server SA.

Each distributed media gateway PMi is connected to the corresponding host mobile network RMi by means of the (here mobile) call routing center Ai of said host mobile network RMi. Each item of routing equipment Ai is responsible for routing to the associated distributed media gateway PMi the calls that concern the (here mobile) terminals UE that are connected to its host mobile network RMi and that are managed by the centralized platform PC. Reciprocally, each item of routing equipment Ai is responsible for routing to the mobile terminals UE that are connected to its host mobile network RMi the calls that concern them and that originate from the centralized platform PC via the associated distributed media gateway PMi.

Each call routing center Ai may for example be arranged in the form of a (here mobile) switching center, of the subscriber center or transit center type.

Each call routing center Ai switches the calls that it receives according to routing information that is specific to it and that can be stored in storage means HDi or HC. The latter HDi or HC may be installed in at least one of the host mobile networks RMi and/or in the centralized platform PC. They are, for example, in the form of an information database of the HLR (for "Home Location Register") type or of the HSS (for "Home Subscriber Server") type, in particular when they form part of a host network RMi, as is the case with those referenced HDi in the single FIGURE.

When it is installed in a host mobile network RMi, an information database HDi stores information relating, on the one hand, to the location of the (here mobile) terminals UE that are connected to its host mobile network RMi, including those that belong to users that have taken out a subscription with the mobile virtual operator MVNO, and, on the other hand, at least to the distributed services that correspond to these subscriptions. It is these information data relating to the distributed services that may be used by the centralized platform PC or the host network RMi. The call server SA of the centralized platform PC interfaces the centralized media gateway PMC or a distributed media platform PMi to provide the distributed services that it must provide to mobile terminals UE connected to a host mobile network RMi.

When it is installed in the centralized platform PC, the information database HC stores information relating, on the one hand, to the location of the (here mobile) terminals UE that are connected to the various host mobile networks RMi and that belong to users that have taken out a subscription with the mobile virtual operator MVNO, and, on the other hand, at least to the centralized and where necessary distributed services that correspond to these subscriptions. It is these information data relating to the centralized and where necessary distributed services that may be used by the centralized platform PC or the host network RMi. The call server SA of the centralized platform PC interfaces the centralized media gateway PMC or a distributed media platform PMi to provide the centralized or distributed services that it must provide to the mobile terminals UE connected to a host mobile network RMi.

Centralized services (not shown in the single FIGURE) may also be provided via services equipment (for example of the IP type) connected to the host mobile network RMi, routed via a node of the SGSN (for "Serving GPRS Support Node") type of said network RMi, and via a node of the GGSN (for "Gateway GPRS Support Node") type, these items of services equipment forming part of the centralized platform SC. Here "services equipment" means an item of equipment offering services, such as for example an Internet access server for downloading video.

The invention provides several advantages including:
common services can be accessible at a central node or nodes of the centralized platform,
applications may easily use the common services provided by the centralized platform,
there is a real separation between the session/application layer (control plane) and the media layer (user plane),
the resources allocated to a (M)VNO/(M)VNE may be managed in a global (centralized) manner at the centralized platform, thereby making it possible, in particular, to use a priority mechanism between calls and/or between applications,
the user plane may, where necessary, be managed locally closest to the (mobile) host networks of the (mobile) operators having made agreements with a (M)VNO that uses a communication system according to the invention,
the customers of a (M)VNO may be billed in a centralized manner at the centralized platform,
the costs of deployment and maintenance of a communication system according to the invention are reduced for a (M)VNO,
several (M)VNOs may share the resources allocated to a communication system ((M)VNE) according to the invention, the number of premises and the number of people necessary to operate the communication system may be reduced.

The invention is not limited to the communication system embodiments described above, purely as an example, but it covers all the variants that those skilled in the art can envisage in the context of the following claims.

The invention claimed is:

1. A communication system, comprising:
   a centralized platform configured to be used by at least two mobile virtual operators (MVNOs) and comprising equipment and services management devices, subscriber/subscription data management devices and a call server, arranged to manage jointly a user control plane layer, wherein each MVNO provides subscription based service for subscribers, and
   distributed media gateways connected to said centralized platform via a backbone network, each of the at least two MVNOs includes a routing center and one or more of the distributed media gateways that are associated with the MVNOs, wherein each of the distributed media gateways interconnects the centralized platform to the routing center of a communication network for the MVNO, said each routing center being managed by the centralized platform and configured to route calls from communication terminals to the communication network, and each of the distributed media gateways further being configured to control the user control plane layer jointly with the centralized platform,
   the at least two MVNOs not owning and not operating the backbone network,
   wherein said centralized platform comprises devices for providing centralized services arranged to provide said communication terminals of subscribers with chosen centralized services, and a centralized media gateway connected to said backbone network and to said devices for providing centralized services and arranged, in case of transmission of the user control plane layer by the at least one distributed media gateway, to manage the user control plane layer in order to provide at least a certain number of said centralized services to the communication terminals of the subscribers who have subscribed to said centralized services.

2. The system according to claim 1, further comprising:
   storage devices configured to store information relating, on the one hand, to a location of the communication terminals of subscribers who have taken out a subscription with said at least two MVNOs, and, on the other hand, at least to services corresponding to said subscriptions.

3. The system according to claim 2, wherein at least a portion of said storage devices is installed in said centralized platform.

4. The system according to claim 2, wherein at least a portion of said storage devices is installed in at least one other platform of a host communication network.

5. The system according to claim 4, wherein said storage devices are installed in each of said host communication networks according to inter-operator agreements.

6. The system according to claim 4, wherein said centralized platform is coupled to devices for providing distributed services of at least one of said host communication networks, via at least one of Serving GPRS Serving Node (SGSN) nodes, and is arranged to manage the user plane and control layers in order to provide, through at least one Gateway GPRS Serving Node (GGSN) node, at least a certain number of said distributed services to the communication terminals of the subscribers who are subscribed thereto.

7. The system according to claim 1, wherein said backbone network is arranged to provide at least a quality of service and a traffic classification at its ends.

8. The system according to claim 1, wherein said backbone network is at least one of an Internet Protocol (IP) network and/or Asynchronous Transfer Mode (ATM) network and/or Time Division Multiplexing (TDM) network.

9. The system according to claim 8, wherein said backbone network is the IP network and arranged to provide the transport of voice and signaling under IP.

* * * * *